(12) United States Patent
Jordan (10) Patent No.: US 9,902,349 B2
(45) Date of Patent: Feb. 27, 2018

(54) VEHICLE BUMPER ASSEMBLY

(71) Applicant: Ford Global Technologies, LLC, Dearborn, MI (US)

(72) Inventor: Marcus Jordan, Southfield, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/077,504

(22) Filed: Mar. 22, 2016

(65) Prior Publication Data

US 2017/0274849 A1 Sep. 28, 2017

(51) Int. Cl.
*B60R 19/04* (2006.01)
*B60R 19/34* (2006.01)
*B60R 19/02* (2006.01)

(52) U.S. Cl.
CPC ............ *B60R 19/04* (2013.01); *B60R 19/023* (2013.01); *B60R 19/34* (2013.01)

(58) Field of Classification Search
CPC ........ B60R 19/023; B60R 19/34; B60R 19/04
See application file for complete search history.

(56) References Cited

U.S. PATENT DOCUMENTS

| | | | |
|---|---|---|---|
| 4,465,312 A | 8/1984 | Werner | |
| 4,509,782 A | 4/1985 | Manning | |
| 6,554,176 B2 | 4/2003 | McGill | |
| 6,595,502 B2 * | 7/2003 | Koch | B60R 19/04 188/377 |
| 6,695,368 B1 | 2/2004 | Weykamp et al. | |
| 7,210,719 B2 | 5/2007 | Honda et al. | |
| 7,399,015 B2 * | 7/2008 | Patel | B60R 19/56 293/133 |
| 7,854,454 B2 * | 12/2010 | Yang | B60R 19/023 293/155 |
| 7,926,865 B2 | 4/2011 | Terada et al. | |
| 7,931,318 B2 * | 4/2011 | Matsumura | B60R 19/24 293/133 |
| 8,029,033 B2 * | 10/2011 | Hama | B60R 19/023 293/102 |
| 8,414,041 B2 * | 4/2013 | Paare | B60R 19/18 293/132 |
| 8,454,080 B2 * | 6/2013 | Qu | B60R 19/34 293/133 |
| 8,662,546 B2 | 3/2014 | Kizaki et al. | |
| 8,733,823 B2 * | 5/2014 | Brockhoff | B60R 19/34 293/133 |

(Continued)

FOREIGN PATENT DOCUMENTS

CA 2571390 A1 11/2006
CN 203402258 U 1/2014

(Continued)

*Primary Examiner* — D Glenn Dayoan
*Assistant Examiner* — Paul Chenevert
(74) *Attorney, Agent, or Firm* — Jason C. Rogers; Bejin Bieneman PLC (57) ABSTRACT

A bumper assembly includes a bumper beam, an extension, a crush can, and a bracket. The bumper beam extends longitudinally from a first end to a second end. The extension attaches to the first end of the bumper beam and has a segment parallel to the bumper beam and a leg extending transversely relative to the bumper beam. The crush can is attached to the segment. The bracket extends from the extension and is welded to the crush can.

20 Claims, 11 Drawing Sheets (56) References Cited

U.S. PATENT DOCUMENTS

| | | | |
|---|---|---|---|
| 8,936,299 B2 | 1/2015 | Tanaka et al. | |
| 8,985,671 B1 * | 3/2015 | Lei | B60R 19/04 |
| | | | 296/133 |
| 8,991,903 B1 | 3/2015 | Alavandi et al. | |
| 9,045,100 B2 * | 6/2015 | Kaneko | B60R 19/34 |
| 9,073,502 B2 | 7/2015 | Blumel et al. | |
| 9,139,146 B2 * | 9/2015 | Nakanishi | B60R 19/34 |
| 9,199,591 B2 * | 12/2015 | Weil | B60R 19/34 |
| 9,260,135 B2 * | 2/2016 | Butukuri | B62D 21/155 |
| 9,290,140 B2 * | 3/2016 | Matsushiro | B60R 19/023 |
| 9,327,665 B2 * | 5/2016 | Barbat | B60R 19/34 |
| 9,527,464 B2 * | 12/2016 | Clauser | B60R 19/24 |
| 9,539,966 B2 * | 1/2017 | Kato | B62D 21/152 |
| 9,550,463 B2 | 1/2017 | Hara et al. | |
| 9,669,787 B2 * | 6/2017 | Nishimura | B60R 19/34 |
| 2006/0181090 A1 * | 8/2006 | Boivin | B60R 19/18 |
| | | | 293/146 |
| 2007/0176442 A1 * | 8/2007 | Mori | B60R 19/34 |
| | | | 293/133 |
| 2007/0200373 A1 | 8/2007 | Miller et al. | |
| 2009/0140546 A1 * | 6/2009 | Okabe | B60R 19/18 |
| | | | 296/187.09 |
| 2014/0091595 A1 | 4/2014 | Ramoutar et al. | |
| 2014/0312637 A1 | 10/2014 | Ramoutar et al. | |
| 2015/0151698 A1 * | 6/2015 | Lee | B60R 19/18 |
| | | | 293/120 |
| 2015/0151699 A1 | 6/2015 | Kaneko et al. | |
| 2015/0298634 A1 | 10/2015 | Hara et al. | |
| 2015/0336525 A1 | 11/2015 | Nam et al. | |
| 2016/0144814 A1 * | 5/2016 | Ahn | B23K 9/16 |
| | | | 293/133 |
| 2017/0129432 A1 * | 5/2017 | Daido | B60R 19/34 |

FOREIGN PATENT DOCUMENTS

| | | | | |
|---|---|---|---|---|
| DE | 10256000 A1 | * | 6/2004 | ............ B60R 19/34 |
| DE | 102006002871 A1 | * | 8/2007 | ............ B60R 19/26 |
| DE | 102010023987 A1 | * | 2/2011 | ............ B60R 19/34 |
| DE | 102016200983 A1 | * | 7/2017 | ........... B60R 19/023 |
| EP | 0949092 A1 | * | 10/1999 | ............... B60D 1/04 |
| EP | 2415643 A1 | * | 2/2012 | ............ B60R 19/34 |
| EP | 2540575 A2 | * | 1/2013 | ............ B60R 19/12 |
| FR | 2903061 A1 | * | 1/2008 | ............ B60R 19/34 |
| KR | 01583520000 B1 | | 1/1999 | |
| KR | 20150134977 A | | 12/2015 | |
| WO | WO 2011058623 A1 | * | 5/2011 | ............ B60R 19/24 |
| WO | WO 2012101923 A1 | * | 8/2012 | ............ B60R 19/34 |
| WO | WO 2014173476 A1 | * | 10/2014 | ........... B62D 21/152 |
| WO | WO 2015015067 A1 | * | 2/2015 | ........... B62D 21/152 |

* cited by examiner

VEHICLE BUMPER ASSEMBLY

BACKGROUND

Bumpers assemblies of vehicles are designed to absorb energy and/or transfer energy during vehicle impacts. Such vehicle impacts may include frontal impacts. Frontal impacts may be simulated with crash tests, such as, a frontal impact test, a frontal oblique impact test, small offset rigid barrier (SORB) test, etc. As one example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

The design of the bumper assembly to absorb and/or transfer energy during vehicle impacts may create difficulties in other design factors, such as manufacturing and vehicle styling. In particular, the size and shape of the bumper assembly affects the outward aesthetic appearance of the front end of the vehicle. There remains an opportunity to design a bumper assembly that satisfies these competing design factors.

DETAILED DESCRIPTION

With reference to the Figures, wherein like numerals indicate like parts throughout the several views, a bumper assembly 30 includes a bumper beam 32, an extension 56, a crush can 66, and a bracket 104, 108. The bumper beam 32 extends longitudinally from a first end 40 to a second end 42. The extension 56 attaches to the first end 40 of the bumper beam 32 and has a segment 74 parallel to the bumper beam 32 and a leg 76 extending transversely relative to the bumper beam 32. The crush can 66 is attached to the segment 74. The bracket 104, 108 is fixed to the crush can 66, 68 and is welded to the extension 56.

The bracket 104, 108 may strengthen the bumper assembly 30 and may improve performance of a vehicle 46 during a vehicle impact, such as a SORB impact scenario. In particular, the bracket 104, 108 reinforces the bumper beam 32, the inner extension 34, and the outer extension 36 to absorb energy during the vehicle impact and/or to push the vehicle in a cross-vehicle direction to reduce the energy transferred to the vehicle during the vehicle impact. The welding of the bracket 104, 108 may reduce design restrictions on the possible shape of the bumper assembly 30. Specifically, the bracket 104, 108 positions welds between the crush can 66 and the extension 56 to relatively easily accessible positions. This reduces or eliminates difficult to access weld locations, which may allow the bumper assembly 30 to be shaped in shapes not otherwise possible, e.g., with relatively sharp angles between the extensions 34, 36, and the crush cans 66.

Figure 7:
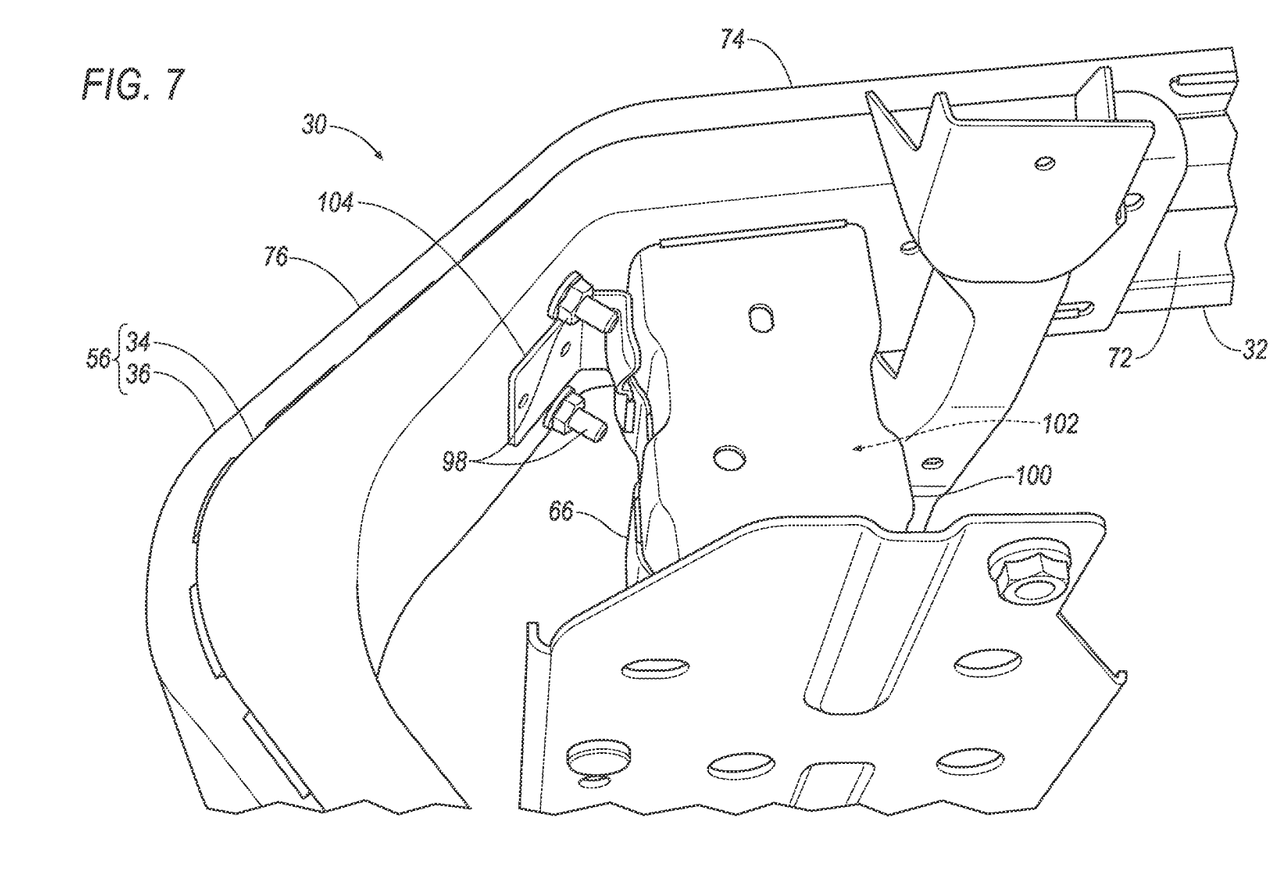
FIG. 7 is another rear perspective view of a portion of the bumper assembly of FIG. 2.
Figure 8:
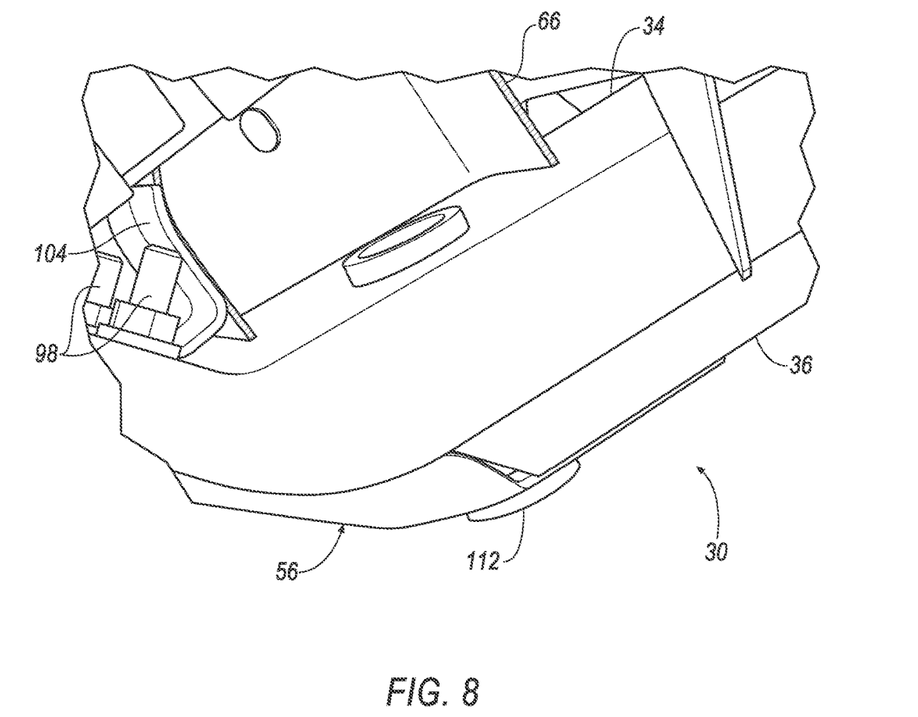
FIG. 8 is a top view of the bumper assembly of FIG. 2 including a barrel nut for a tow hook.
Figure 9:
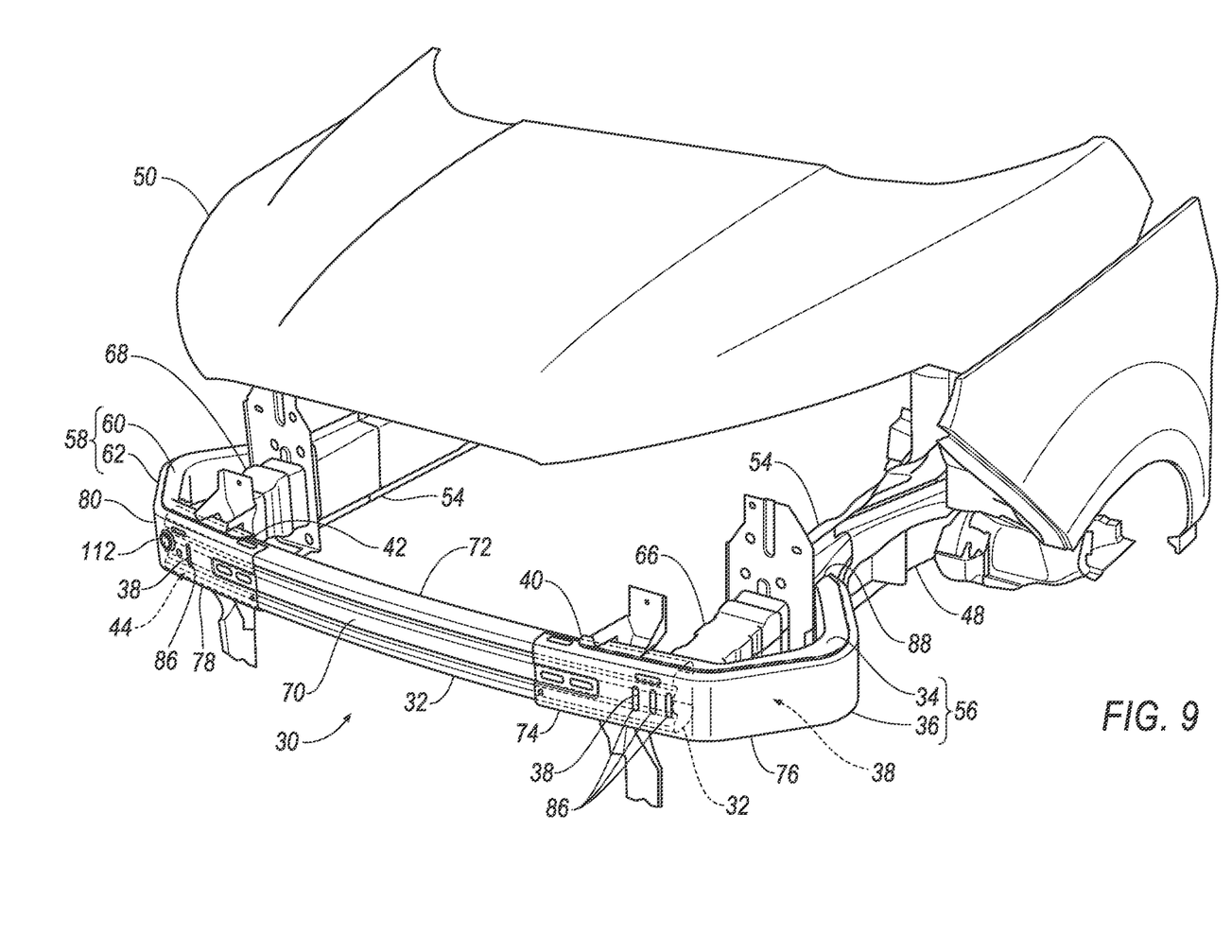
FIG. 9 is a perspective view of a second embodiment of the bumper assembly.
Figure 10:
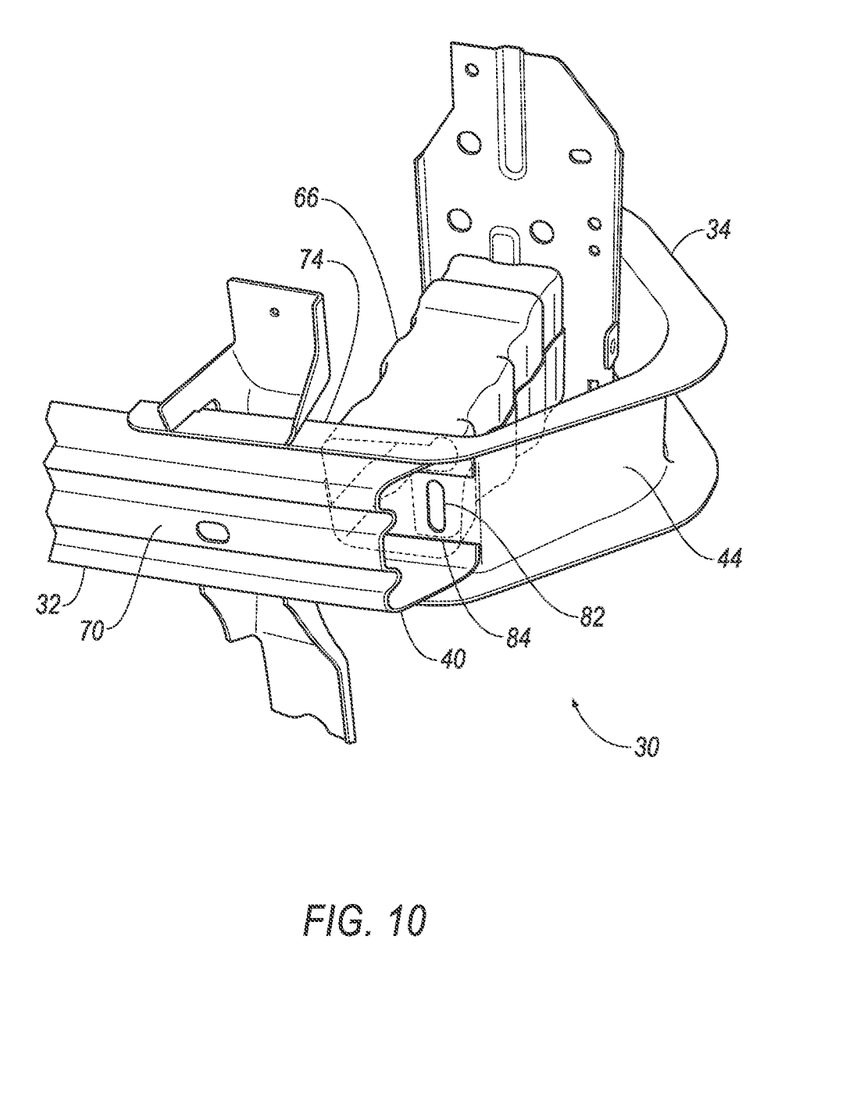
FIG. 10 is a perspective view of a portion of the bumper assembly of FIG. 9 with an outer extension removed.
Figure 11:
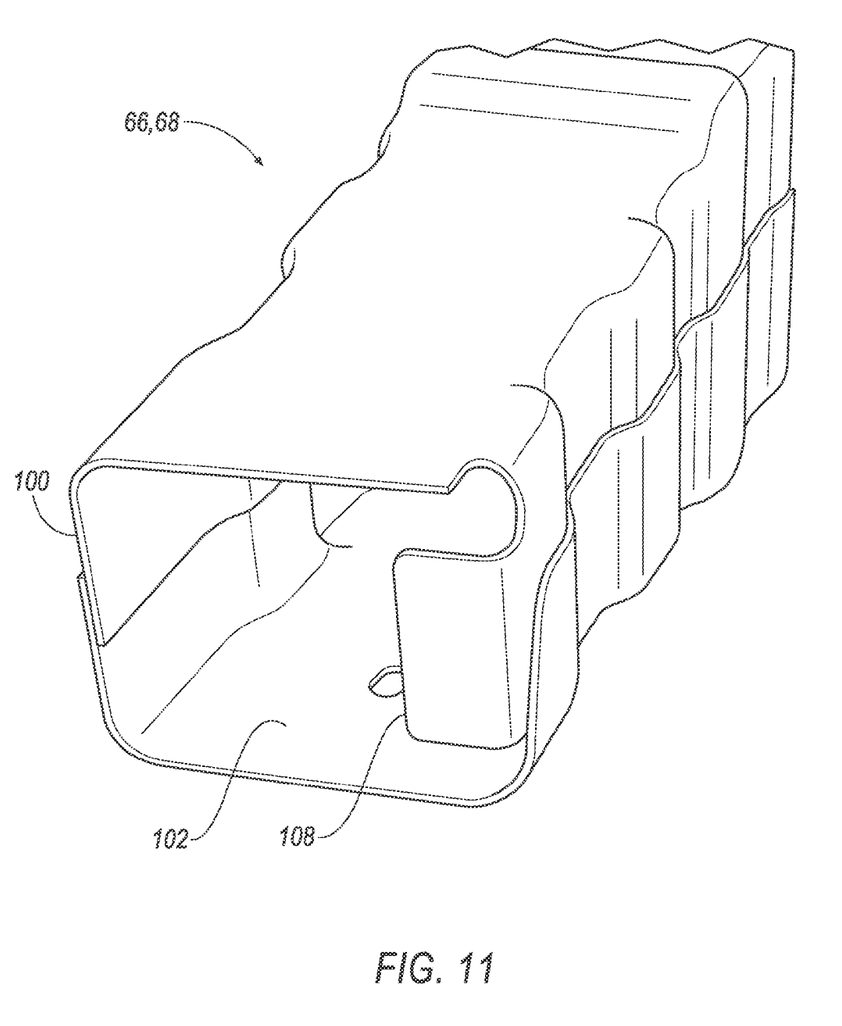
FIG. 11 is a perspective view of a crush can of the bumper assembly of FIG. 9.

A first embodiment of the bumper assembly 30 is shown in FIGS. 1-8, and a second embodiment of the bumper assembly 30 is shown in FIGS. 9-11. As set forth further below, the first embodiment of the bumper assembly includes a first embodiment of the bracket 104, as shown in FIGS. 5-8. The second embodiment of the bumper assembly includes a second embodiment of the bracket 108, as shown in FIGS. 10-11.

Figure 1:
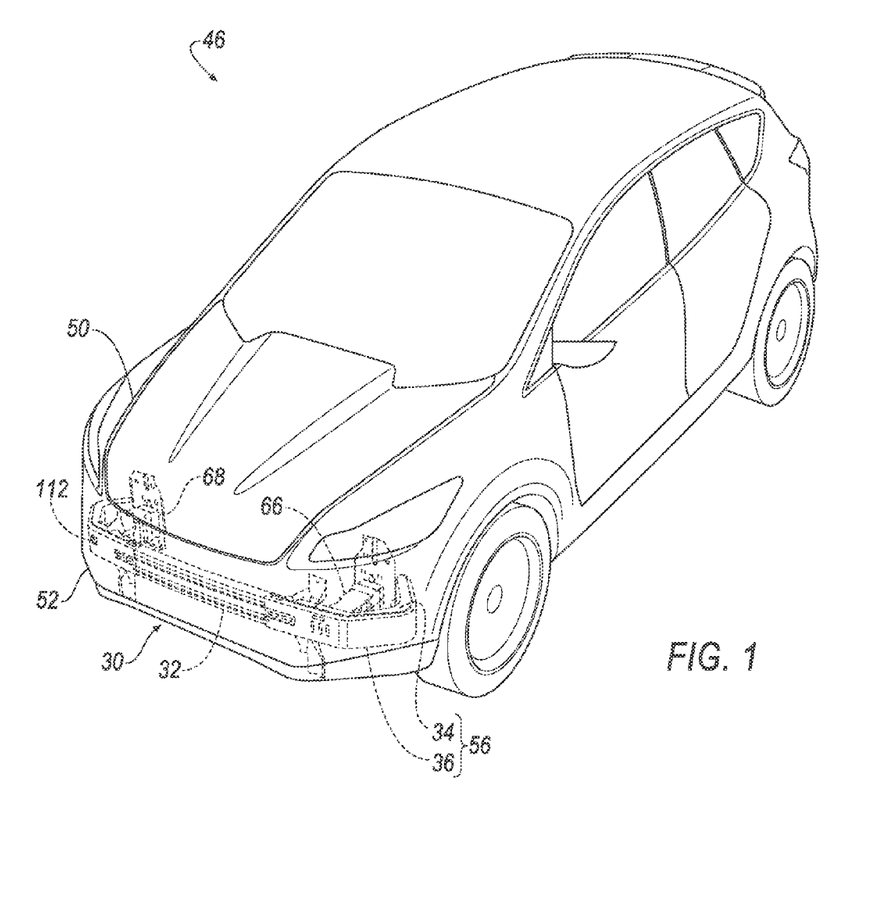
FIG. 1 is a perspective view of a vehicle.

With reference to FIG. 1, the vehicle 46 may include a frame 48, a hood 50, and the bumper assembly 30 attached to the frame 48 below the hood 50. The bumper assembly 30 may be disposed toward a front of the vehicle 46. The vehicle 46 may include a fascia 52 concealing the bumper. The fascia 52 may be supported by the frame 48 and/or body components of the vehicle.

Figure 2:
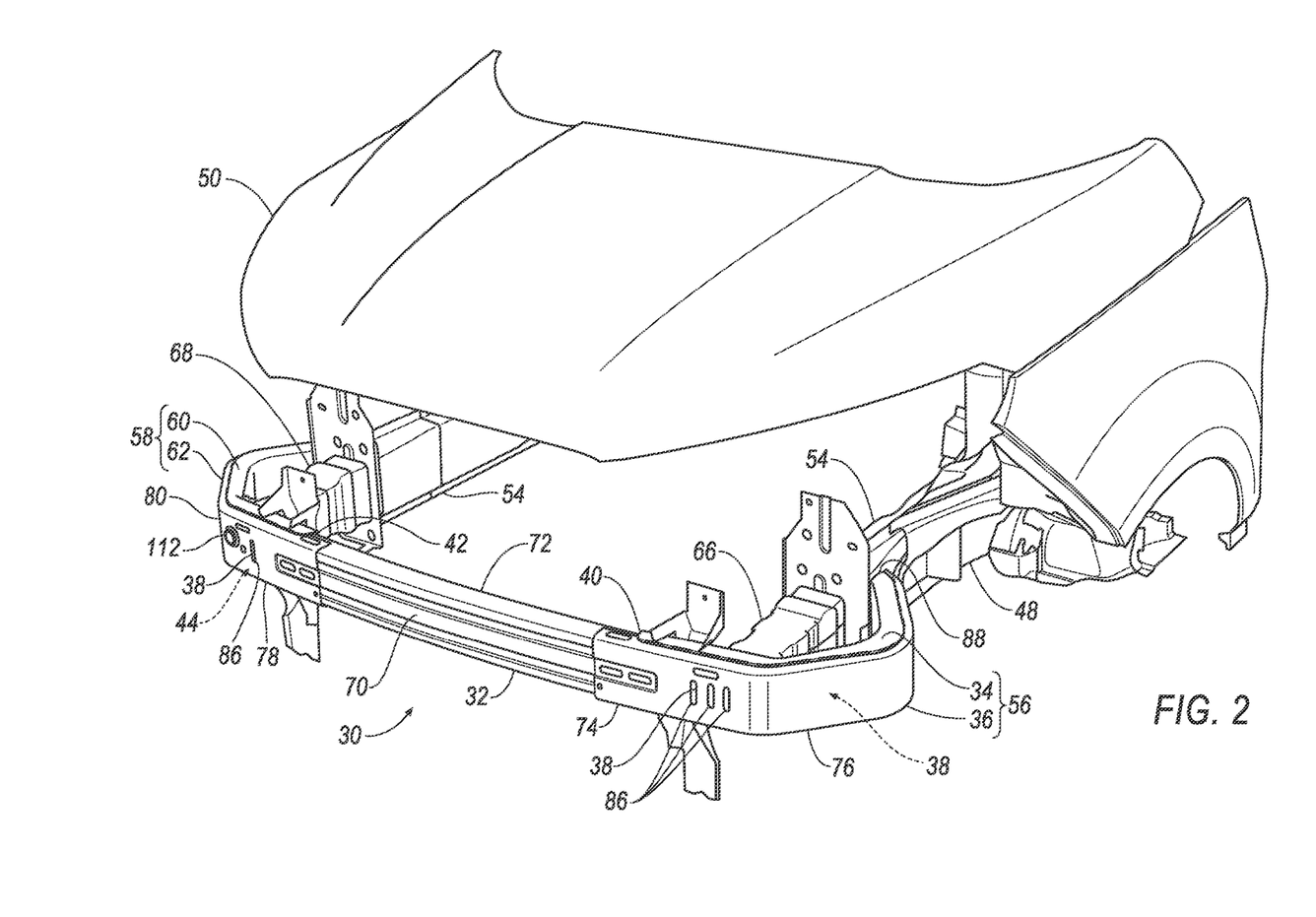
FIG. 2 is a perspective view of one embodiment of a bumper assembly and a vehicle frame.

With reference to FIGS. 2 and 9, the frame 48 may support body components of the vehicle 46. The frame 48 may include upper chassis rails 54. The frame 48 may be of a unibody construction in which at least some of the frame 48 is exposed and may present a class-A surface (not numbered), i.e., a surface specifically manufactured to have a high-quality, finished aesthetic appearance free of blemishes. The frame 48 may, alternatively, be of a body-on-frame construction, or of any other suitable construction. The frame 48 may be formed of any suitable material, for example, steel, aluminum, etc.

The upper chassis rails 54 may extend longitudinally in the direction of travel for the vehicle 46, i.e., a vehicle fore-aft direction, toward a front of the vehicle 46. The upper chassis rails 54 may be attached to the bumper assembly 30, as set forth further below.

With continued reference to FIGS. 2 and 9, the bumper assembly 30 may include two extensions 56, 58, specifically, extension 56 and second extension 58. The extension 56 includes the inner extension 34, the outer extension 36, and the reinforcing element 38 (shown in FIG. 4). The second extension 58 includes a second inner extension 60, a second outer extension 62, and another reinforcing element 38 (not shown). The extension 56 may be disposed at the first end 40 of the bumper beam 32 and the second extension 58 may be disposed at the second end 42 of the bumper beam 32. The extensions 56, 58 may be mirror images of each other. Although the reinforcing elements 38 are not shown in the second embodiment of the bumper assembly 30 (FIGS. 9-11), the second embodiment of the bumper assembly 30 may include the reinforcing elements 38.

With continued reference to FIGS. 2 and 9, the bumper beam 32 extends longitudinally from the first end 40 to the second end 42. The bumper beam 32 may have a vehicle-forward face 70 and a vehicle-rearward face 72, which respectively face the direction of the vehicle 46 when traveling forward and the direction of the vehicle 46 when traveling in reverse. The bumper beam 32 may reinforce the structural integrity of the vehicle 46. The bumper beam 32 may be formed of any suitable material, for example, steel, aluminum, etc.

Figure 3:
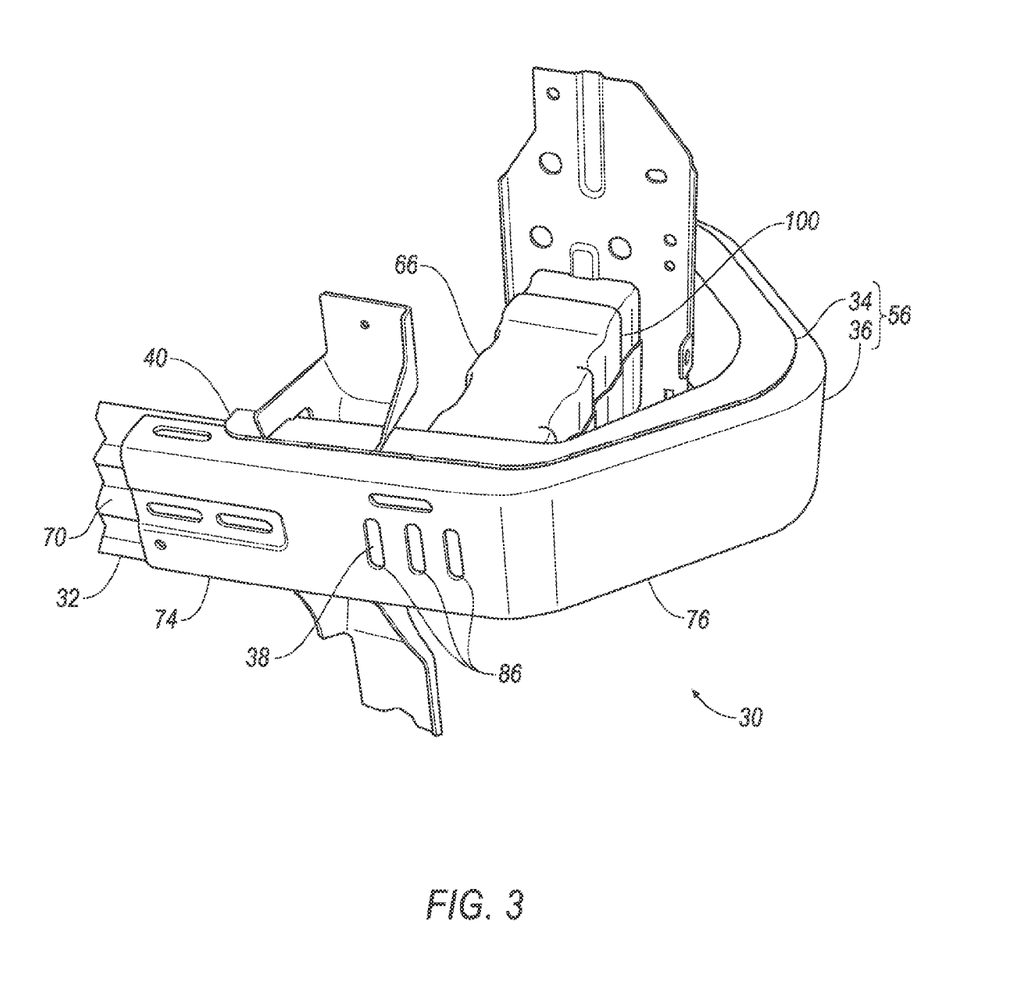
FIG. 3 is a perspective view of a portion of the bumper assembly of FIG. 2.

With reference to FIGS. 3 and 10, the extension 56 is attached to the first end 40 of the bumper beam 32 and has a segment 74 parallel to the bumper beam 32 and a leg 76 extending transversely relative to the bumper beam 32. The second extension 58 is attached to the second end 42 of the bumper beam 32 and has a second segment 78 parallel to the bumper beam 32 and a second leg 80 extending transversely relative to the bumper beam 32. The leg 76 and the second leg 80 extend from the vehicle-rearward face 72 of the bumper beam 32.

With continued reference to FIGS. 3 and 10, the extensions 56, 58 each include an inner extension 34, 60 and an outer extension 36, 62 attached together. The inner extension 34 is welded to the first end 40 of the bumper beam 32, and the second inner extension 60 is welded to the second end 42 of the bumper beam 32. Specifically, the inner extension 34 and the second inner extension 60 abut, and are welded to, the vehicle-rearward face 72 of the bumper beam 32. The inner extension 34, 60 define at least a portion of the leg 76, 80 and at least a portion of the segment 74, 78. The inner extension 34, 60 may be formed of any suitable material, for example, steel, aluminum, etc.

The outer extension 36 is welded to the inner extension 34, and the second outer extension 62 is welded to the second inner extension 60. The outer extension 36 may include holes 86 aligned with an end 94 of the reinforcing element 38, and the outer extension 36 may be welded to the reinforcing element 38 at the holes 86. Likewise, the second outer extension 62 may include holes 86 aligned with an end 94 of the respective reinforcing element 38, and the second outer extension 62 may be welded to the respective reinforcing element 38 at the holes 86.

Figure 4:
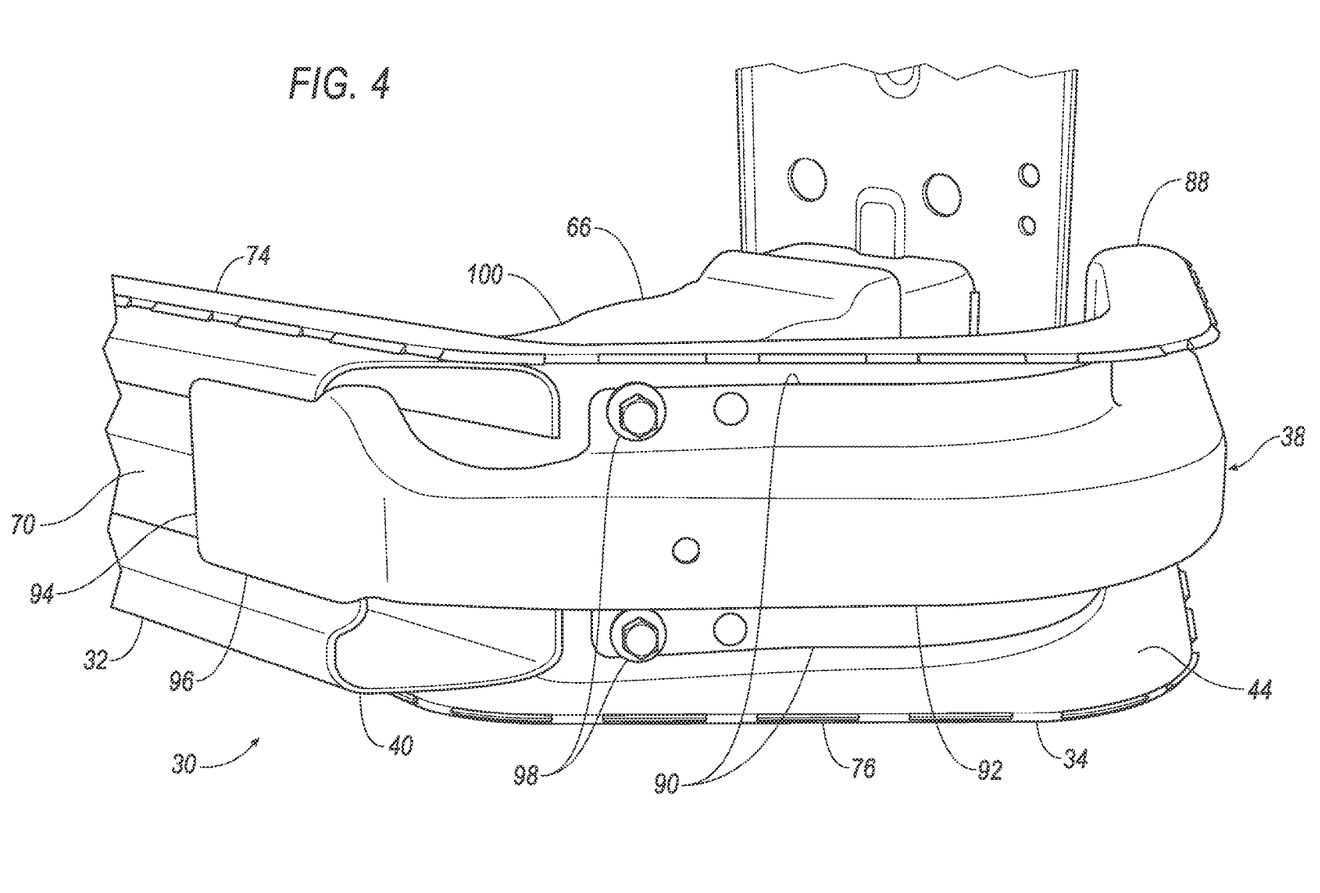
FIG. 4 is a perspective view of a portion of the bumper assembly of FIG. 2 with an outer beam removed for illustrative purposes

The inner extension 34, 60 and the outer extension 36, 62 may be elongated from the bumper beam 32 and define the elongated cavity 44 therebetween. With reference to FIG. 4, the reinforcing element 38 may be disposed in and elongated along the cavity 44, between the inner extension 34, 60 and outer extension 36, 62.

With reference to FIGS. 1-4, the extension 56, 58, namely the inner extension 34, 60 and the outer extension 36, 62, includes a cantilevered end 88 spaced from the bumper beam 32. The inner extension 34, 60 and the outer extension 36, 62 may extend coaxially from the bumper beam 32 to the cantilevered end 88. The inner extension 34, 60 and the outer extension 36, 62 may be welded to each other between the bumper beam 32 and the cantilevered end 88. The frame 48 may include a protrusion or other suitable feature for contacting the cantilevered end 88 in the event the cantilevered end 88 is moved in the vehicle-rearward direction during a vehicle impact.

With reference to FIG. 4, the reinforcing element 38 may include flanges 90 abutting the inner extension 34, 60 in the cavity 44 and a rib 92 between the flanges 90 extending coaxially with the inner extension 34, 60. The rib 92 may be elongated along the cavity 44.

The reinforcing element 38 may include an end 94 abutting the first end 40 of the bumper beam 32, specifically, an arm 96 extending from the rib 92 to the first end 40 of the bumper beam 32. The arm 96 may be sandwiched between the holes 86 and the bumper beam 32. The holes 86 in the outer extension 36 may be aligned with the arm 96, and the outer extension 36 may be welded to the arm 96 at the holes 86.

Figure 5:
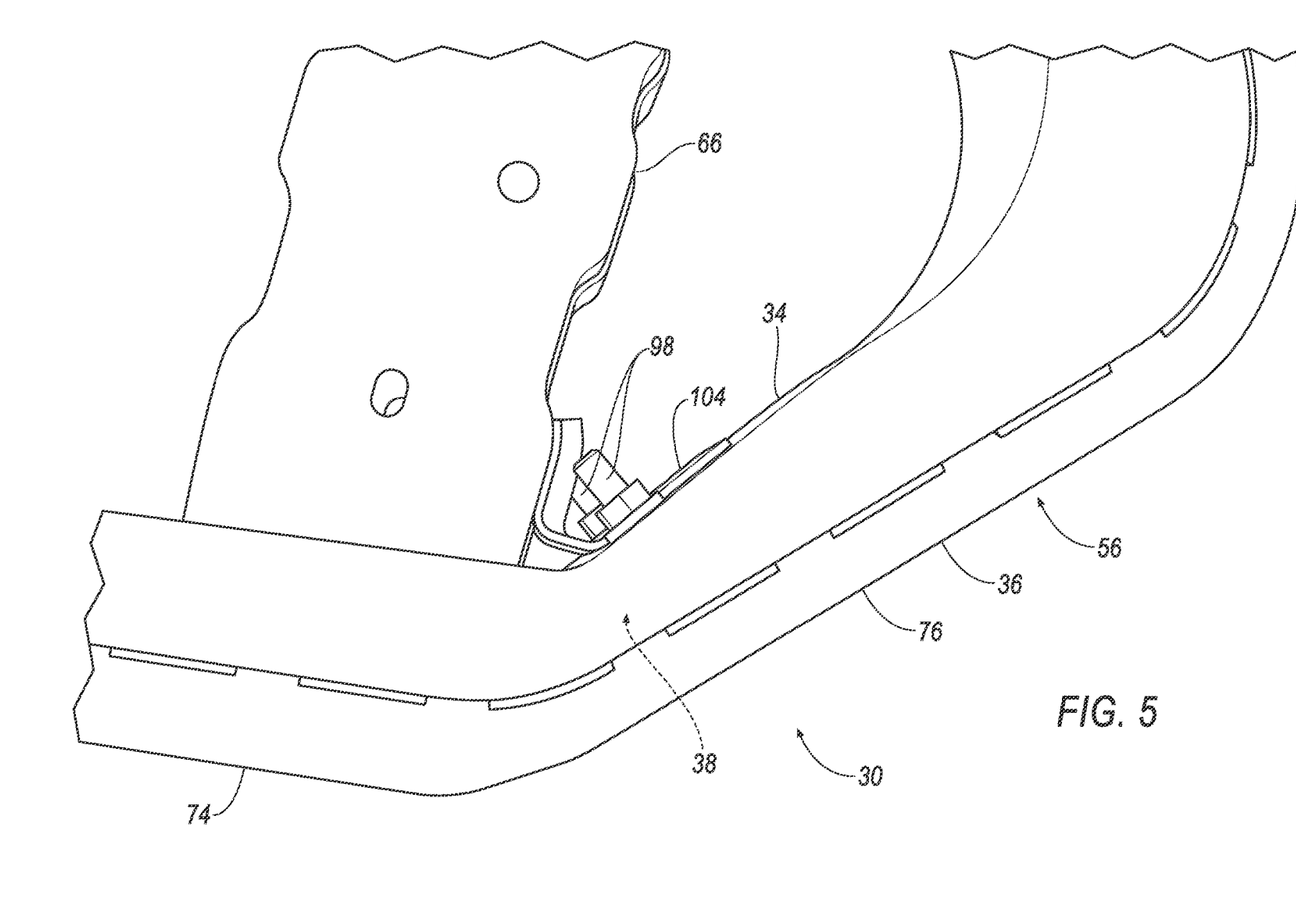
FIG. 5 is a top view of a portion of the bumper assembly of FIG. 2.

With reference to FIGS. 4-8, the reinforcing element 38 may be fastened to the inner extension 34, 60. Specifically, fasteners 98 may fasten the respective reinforcing element 38 to the inner extension 34 and the respective reinforcing element 38 to the second inner extension 60. The fasteners 98 may be threaded bolts and nuts, as shown in FIG. 5, or any other suitable fastener. The flanges 90, in particular, of the reinforcing elements 38 may be fastened to the inner extension 34; specifically, the fasteners 98 may fasten the flanges 90 to the inner extension 34 adjacent the arm 96.

The reinforcing element 38 may strengthen the bumper assembly 30 and may improve performance of a vehicle 46 during a vehicle impact, such as a SORB impact scenario. In particular, the reinforcing element 38 reinforces the bumper beam 32, the inner extension 34, and the outer extension 36 to absorb energy during the vehicle impact and/or to push the vehicle in a cross-vehicle direction to reduce the energy transferred to the vehicle during the vehicle impact. Fastening the reinforcing element 38 to the inner extension 34 may reduce design restrictions on the possible shape of the bumper assembly. Specifically, the fastening of the reinforcing element 38 to the inner extension 34 may reduce or eliminate welds that would require sufficient space for welding tools to reach a boundary between the reinforcing element 38 and the inner extension 34. By reducing or eliminating such welds, the fastening of the reinforcing element 38 to the inner extension 34 eliminates the necessity for space for the welding tools, which may allow the bumper assembly 30 to be shaped in shapes not otherwise possible, e.g., with relatively sharp angles between the extensions 34, 36, and the bumper beam 32.

The extensions 56, 58 may extend longitudinally along a path, respectively, arced relative to the bumper beam 32. In particular, the path may extend from the bumper beam 32 in the vehicle rearward direction. The extensions 56, 58 may extend outboard of the upper chassis rails 54, respectively, and may turn inwardly toward the upper chassis rails 54. The inner extensions 34, 60 and the outer extensions 36, 62 may extend longitudinally along the path defining the elongated cavity 44 along the path. The inner extensions 34, 60 may extend longitudinally along the paths, respectively, inside the elongated cavity 44.

With reference to FIGS. 2-11, the bumper assembly 30 may include crush cans 66, 68 supporting the rest of the bumper assembly 30 on the frame 48. In other words, crush cans 66, 68 extend from the frame 48 to the bumper beam 32 and supports the weight of the bumper beam 32 and the extensions 56, 58. The crush cans 66, 68 may, for example, be fastened to the upper chassis rails 54. The crush can 66, 68 may be attached, for example, welded, to the inner extension 34, 60. Specifically, the crush cans 66, 68 may be attached to the segments 74, 78.

The crush cans 66, 68 may extend from the vehicle-rearward face 72 of the bumper beam 32. The crush can 66 may include a wall 100 defining a cavity 102 elongated in a direction transverse to the bumper beam 32.

The crush cans 66, 68 may serve as energy absorbers, sometimes known as "crumple zones." The crush cans 66, 68 may absorb some of the energy of a collision of the vehicle 46 through deformation, thus lessening the amount of energy transferred to the rest of the frame 48 and the vehicle 46.

With reference to FIGS. 1, 2, and 8, a barrel nut 112 may be attached to and extend through the inner extension 34 and the outer extension 36. The barrel nut 112 may be designed to receive a tow hook. This placement of the barrel nut 112 allows the tow hook to take advantage of the strength of the frame 48 rather than relying on external components of the vehicle 46.

The bracket 104, 108 may be fixed to the crush can 66, 68 and welded to the extension 56, 58. As set forth above, a first embodiment of the bracket 104 is shown in FIGS. 5-8, and a second embodiment of the bracket 108 is shown in FIGS. 10 and 11.

With reference to FIGS. 5-8, the first embodiment of the bracket may be an external bracket 104. In other words, the external bracket 104 may be external to the extension 56, 58 and the crush can 66, 68. The external bracket 104 may be attached to the inner extension 34, 60, such as to the leg 76, 80 and to the crush can 66, 68. Specifically, the external brackets 104 may be welded to the vehicle-rearward face 72 of the legs 76, 80 of the extensions 56, 58 and welded to the crush cans 66, 68.

Figure 6:
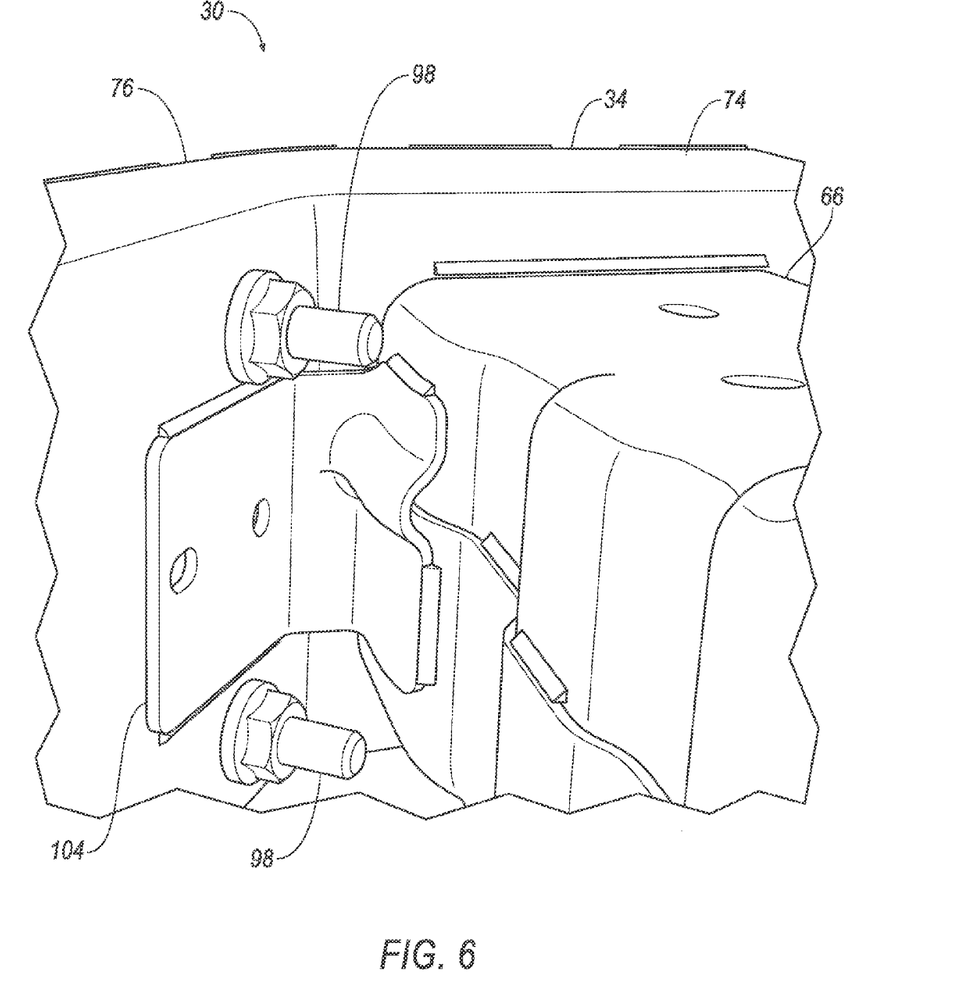
FIG. 6 is a rear perspective view of a portion of the bumper assembly of FIG. 2.

The external bracket 104 may extend along an acute angle defined between the leg 76, 80 and the crush can 66, 68. The external bracket 104 may be, for example, generally V-shaped. The external bracket 104 may, for example, extend along the legs 76, 80 between the fasteners 98, as shown in FIGS. 6 and 7. The external bracket may be formed of any suitable type of material, e.g., steel, aluminum, etc.

With reference to FIGS. 10 and 11, the second embodiment of the bracket may be a flange 108 extending from the crush cans 66, 68. The flange 108 may extend from the wall 100 of the crush can 66, 68 into the cavity 102.

The flange 108 may be attached to the inner extension 34, 60. The segment 74, 78 may include a slot 82 defined in the inner extension 34, 60 between the crush can 66, 68, and the flange 108 may be welded to the segment 74, 78 at the slot 82.

The flange 108 may be integral with the crush can 66, 68, i.e., the flange 108 may be formed simultaneously with the crush can 66, 68 as a single continuous unit. Alternatively, the flange 108 may be formed separately from the crush can 66, 68 and subsequently fixed to the crush can 66, 68.

With reference to FIG. 10, the bumper beam 32 may include a cutout 84 along the inner extension 34, 60. The slot 82 may be exposed to the cavity 44 through the cutout 84. The cutout 84 allows welding access to the slot 82.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly comprising:
   a bumper beam extending longitudinally from a first end to a second end;
   an extension attached to the first end of the bumper beam and having a segment parallel to the bumper beam and a leg extending transversely relative to the bumper beam;
   a crush can attached to the segment; and
   an external bracket attached to the leg and to the crush can, wherein the external bracket is V-shaped at an acute angle.

2. The bumper assembly of claim 1, wherein the bumper beam has a vehicle-rearward face, and the crush can and the leg both extend from the vehicle-rearward face.

3. The bumper assembly of claim 1, wherein the crush can is welded to the segment of the extension.

4. The bumper assembly of claim 1, wherein the external bracket is welded to the leg of the extension and welded to the crush can.

5. The bumper assembly of claim 1, further comprising:
   a second extension attached to the second end of the bumper beam, the second extension having a second segment parallel to the bumper beam and a second leg extending transversely relative to the bumper beam;
   a second crush can attached to the second segment of the second extension; and
   a second external bracket attached to the second leg of the second extension and to the second crush can.

6. The bumper assembly of claim 1, wherein the extension includes a cantilevered end spaced from the bumper beam.

7. The bumper assembly of claim 1, wherein the extension includes an inner extension and an outer extension extending coaxially from the first end of the bumper beam, the inner extension defining at least a portion of the leg and at least a portion of the segment, the crush can and the external bracket being attached to the inner extension.

8. The bumper assembly of claim 7, wherein the crush can is welded to the segment of the extension, the external bracket is welded to the leg of the extension and welded to the crush can, and the extension includes a cantilevered end.

9. A bumper assembly comprising:
   a bumper beam extending longitudinally from a first end to a second end;
   an extension attached to the first end and having a segment parallel to the bumper beam and a leg extending transversely relative to the bumper beam, the segment having a slot extending from a front face to a rear face of the segment; and
   a crush can extending from the rear face; and
   a flange fixed to the crush can and welded to the segment at the slot, wherein the flange extends along the rear face across the slot.

10. The bumper assembly of claim 9, wherein the crush can includes a wall defining a cavity elongated in a direction transverse to the bumper beam, wherein the flange extends from the wall into the cavity.

11. The bumper assembly of claim 9, wherein the bumper beam has a vehicle-rearward face, and the crush can and the leg both extend from the vehicle-rearward face.

12. The bumper assembly of claim 9, wherein the extension includes an inner extension and an outer extension extending coaxially from the first end of the bumper beam, the inner extension defining at least a portion of the leg and the segment, the crush can and the flange being attached to the inner extension.

13. The bumper assembly of claim 9, wherein the crush can is welded to the segment of the extension.

14. The bumper assembly of claim 9, wherein the extension includes a cantilevered end spaced from the bumper beam.

15. A bumper assembly comprising:
   a bumper beam extending longitudinally from a first end to a second end;
   an extension attached to the first end of the bumper beam and having a segment parallel to the bumper beam and a leg extending transversely relative to the bumper beam;
   a crush can attached to the segment; and
   a bracket fixed to the crush can and welded to the extension, wherein the bracket is V-shaped at an acute angle.

16. The bumper assembly of claim 15, wherein the bracket is welded to the leg of the extension and is welded to the crush can.

17. The bumper assembly of claim 15, wherein the crush can is welded to the segment of the extension.

18. The bumper assembly of claim 15, wherein the segment has a slot and the bracket is welded to the segment at the slot.

19. The bumper assembly of claim 18, wherein the crush can includes a wall defining a cavity elongated in a direction transverse to the bumper beam, wherein the flange extends from the wall into the cavity.

20. The bumper assembly of claim 19, wherein the extension includes an inner extension and an outer extension extending coaxially from the first end of the bumper beam, the inner extension defining at least a portion of the leg and at least a portion of the segment, the slot being defined in the inner extension between the crush can and the outer extension.

* * * * *